United States Patent
Wu et al.

(10) Patent No.: US 7,428,731 B2
(45) Date of Patent: Sep. 23, 2008

(54) CONTINUOUS TRIP COUNT PROFILING FOR LOOP OPTIMIZATIONS IN TWO-PHASE DYNAMIC BINARY TRANSLATORS

(75) Inventors: Youfeng Wu, Palo Alto, CA (US); Mauricio Breternitz, Jr., Austin, TX (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 10/816,248

(22) Filed: Mar. 31, 2004

(65) Prior Publication Data

US 2005/0240896 A1 Oct. 27, 2005

(51) Int. Cl.
*G06F 9/44* (2006.01)
*G06F 9/45* (2006.01)

(52) U.S. Cl. .................. 717/158; 717/130; 717/153; 717/160

(58) Field of Classification Search ................... None
See application file for complete search history.

(56) References Cited

U.S. PATENT DOCUMENTS 6,938,249 B2 * 8/2005 Roediger et al. ............ 717/160

OTHER PUBLICATIONS

Ghost et al., "Integrating High-Level Optimizations in a Production Compiler: Design and Implementation Experience", Apr. 4, 2002, Springer-Verlag Berlin Heidelberg, pp. 303-319.*
Chen et al., "Dynamic Trace Selection Using Performance Monitoring Hardware Sampling", Mar. 23, 2003, IEEE, pp. 79-90.*
Lu et al., "The Performance of Runtime Data Cache Prefetching in a Dynamic Optimization System", Dec. 3, 2003, IEEE, pp. 1-11.*
Wu et al., "Continuous Trip Count Profiling for Loop Optimizations in Two-phase Dynamic Binary Translators", Feb. 15, 2004, IEEE, pp. 1-10.*
Wu et al., "The Accuracy of Inital Prediction in Two-Phase Dynamic Binary Translators", Mar. 20, 2004, IEEE, pp. 1-12.*
Arnold, Matthew, Ryder Barbara G., A Framework for Reducing the Cost of Instrumented Code, PLDI 2001, Snowbird, Utah, Copyright 2001 ACM, 12 pages.
Chen, Michael K., Olukotun, Kunle, Test: A Tracer for Extracting Speculative Threads, © 2003 IEEE, Published in the Proceedings of CGO'03, Mar. 24-26, 2003 in San Francisco, CA, U.S.A., IEEE Service Center/445 Hoes Lane/P.O. Box 1331/Piscataway, NJ 08855-1331, U.S.A., 12 pages.

* cited by examiner

*Primary Examiner*—Tuan Q. Dam
*Assistant Examiner*—Ben C Wang
(74) *Attorney, Agent, or Firm*—Derek J. Reynolds

(57) ABSTRACT

A method, machine readable medium, and system are disclosed. In one embodiment the method comprises collecting a loop trip count continuously during runtime of a region of code being executed that contains a loop, categorizing the trip count to identify one or more code modification techniques applicable to the loop, and dynamically applying the one or more applicable code modification techniques to alter the code that relates to the loop.

21 Claims, 7 Drawing Sheets

CONTINUOUS TRIP COUNT PROFILING FOR LOOP OPTIMIZATIONS IN TWO-PHASE DYNAMIC BINARY TRANSLATORS

FIELD OF THE INVENTION

The invention is related to software compilers and translators. More specifically, the invention relates to continuous trip count profiling for loop optimizations in dynamic software compilers.

BACKGROUND OF THE INVENTION

Most dynamic binary translators such as IA32EL, Transmeta, Daisy, Dynamo, BOA, and ARIES use a two-phase approach to identify and improve frequently executed code dynamically. In the first step, the profiling phase, blocks of code are interpreted or translated without optimization to collect execution frequency information for the blocks. In the second phase, the optimization phase, frequently executed blocks are grouped into regions, including loop regions, and advanced optimizations are applied on them. For example, the profiling phase in Intel® Corporation's IA32EL converts each IA32 block quickly into Itanium® Processor Family code with instrumentation for collecting the block's "use" count, the number of times the block is visited, and the block's "taken" count, the number of times its conditional branch is taken. When the use count for a block reaches a retranslation threshold, the block is registered in a pool of candidate blocks. When a sufficient number of blocks are registered or when a block is registered twice, the optimization phase begins to retranslate the candidate blocks. The optimization phase uses the ratio taken/use as the branch probability to form regions for optimizations and instruction scheduling. Some optimizations may also use the taken/use values to determine a loop's trip count (the number of times the loop body is executed each time the loop is entered).

The profiling phase cannot be very long, or the benefit of the optimizations will be reduced as the code is executed without optimization for a prolonged period. Typical retranslation thresholds are usually small, ranging from tens to a few thousand.

This approach implicitly assumes that the execution profile of each block in the profiling phase is representative of the block throughout its lifetime. In particular, the trip count information derived from the block information is assumed to be representative of the behavior of the loop during all phases of execution, including late execution. However, if the trip count information collected during the profiling phase is not representative of the loop behavior in later stages of execution, a loop may be improperly optimized and program performance will suffer.

Static profiling techniques are able to obtain accurate trip count information but they accomplish this via a separate training execution of the program that obtains a full program profile of loop trip counts. Static profiling techniques are not as adaptable to optimizing programs that have varied sets of input for each instance the program is executed. Dynamic profiling methods can adapt but they rely on limited runtime techniques utilizing the initial profiling phase to determine loop trip counts. Consequently, the trip count information used for dynamic optimizations is often inaccurate because the initial profile is significantly smaller and less representative of the full program execution than the training input obtained from static profiling.

Thus, there is a need for an effective method to continuously profile loop trip counts and to use the profile results to dynamically optimize the loop throughout the life of the program.

BRIEF DESCRIPTION OF DRAWINGS

The present invention is illustrated by way of example and is not limited by the figures of the accompanying drawings, in which like references indicate similar elements, and in which.

DETAILED DESCRIPTION

Figure 1:
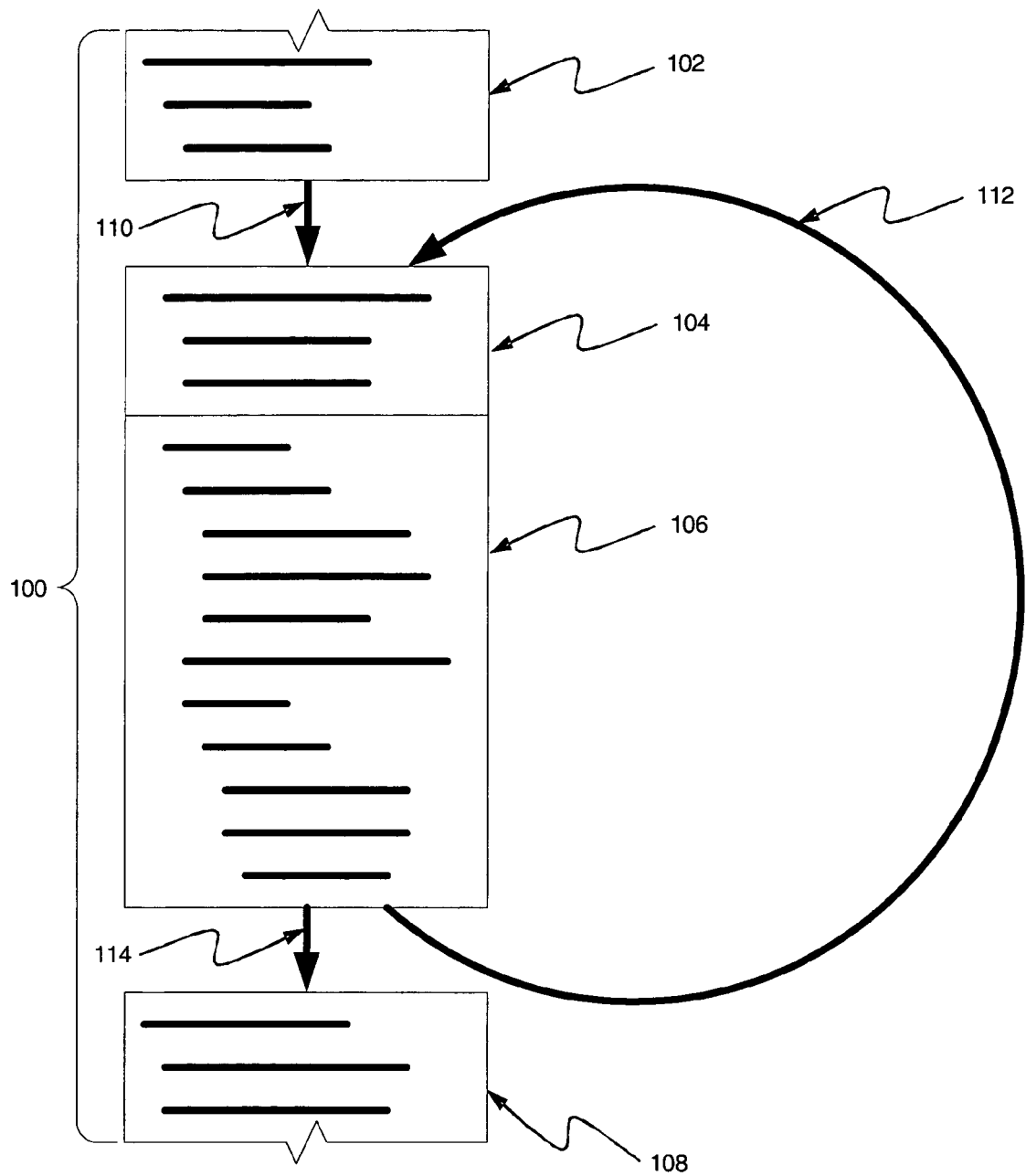
FIG. 1 illustrates an example of a segment of code within which a loop pre-head block, a loop entry block, a loop body, and a loop post-exit block are located.

Embodiments of an effective method to continuously profile loop trip counts and to dynamically optimize the loop throughout the life of the program using the profile results are disclosed. In the following description, numerous specific details are set forth. However, it is understood that embodiments may be practiced without these specific details. In other instances, well-known elements, applications, and techniques have not been discussed in detail in order to avoid obscuring the present invention.

The terms "optimize" and "optimization" referred to throughout this document specifically refer to performing modifications to code. These optimizations are normally performed with the intent to improve the performance throughput of the code, although there are certain optimizations that either have other intents or other results. In certain cases optimizations may be performed on code to modify the resulting output data collected upon execution of the code rather than attempting to improve any performance throughput of the code. Additionally, optimizations could also be performed to modify the data collection capability of performance monitoring code among other goals. In other potential cases, code optimizations could be introduced into the code with the intent to achieve a gain in performance throughput of the code, only to not achieve a gain whatsoever and possibly result in an unwanted performance degradation due to unforeseen circumstances. Therefore, the terms "optimize" and "optimization" do not specifically refer to an optimal configuration of code that will achieve ideal performance. It is not necessarily the case, nor is it likely possible, that any "optimization", as referred to within this document, performed on a segment of code could possibly result in truly optimal performance (i.e. the best theoretical performance throughput). Rather, references to "optimizing" and "optimizations" within this document connote attempts at restructuring code to either potentially gain some level of performance improvement over the original code or to modify some other aspect of the code for the benefit of the user (e.g. modifying the resulting output as referred to above). If the "optimization" was meant to achieve a performance improvement, then whether a real performance improvement is achieved is entirely dependent upon the types of modifications performed, the specific structure and behavior of the original code, and the environment in which the code is executed within.

Embodiments of the present invention relate to the trip count of a loop during execution within a body of code. A loop, as defined within a region of code, is a sequence of code instructions that are usually carried out several times but written just once. The trip count of a loop is the number of times a loop body is executed after the loop is entered. Therefore, the average trip count can be described as the average number of times a loop body is executed each time the loop is entered averaged over a given execution period of time.

FIG. 1 illustrates an example of a segment of code 100 within which a loop pre-head block 102, a loop entry block 104, a loop body 106, and a loop post-exit block 108 are located. Arrows 110, 112, and 114 detail the control flow of the loop within the segment of code 100. In one embodiment during the execution of the program in which code segment 100 is located the control flow of the program reaches prehead block 102. After the code in pre-head block is executed the program control flow 110 enters into the loop body 106 by first executing the loop entry block 104. Once the loop entry block has been executed, the loop body 106 is executed and the control flow 112 loops back to the beginning of the loop body 106 by re-entering the loop entry block 104. The control flow loops for a given number of iterations and eventually exits out of the loop body to enter (114) the loop post-exit block 108. During the execution lifetime of the program, the entire segment of code 100 could be executed numerous times. For example, segment of code 100 could be nested in multiple larger loops that lie within the program. In this example, over a given execution period the average trip count (ATC) can be calculated as follows:

$$ATC = \text{Frequency(Loop Entry Block (104) Execution)} / \text{Frequency(Loop Pre-Head Block (1027) Execution)}$$

For example, if for every time the loop pre-head block 102 was executed the loop entry block 104 executed 50 times, then the average trip count would be 50. The loop entry block 104 will not necessarily execute the same number of times each time the loop is entered. Thus, the average trip count is calculated to obtain a representative trip count over a given execution period. In one embodiment the average trip count could be calculated over a specific period of time, such as one second. In another embodiment the average trip count could be calculated over a specific number of loop iterations, such as 50,000 loop iterations.

Obtaining accurate trip count information in two-phase dynamic binary translators however poses a challenge. During the profiling phase, a loop may have a very different trip count from its execution behavior in the late stages of execution. Thus, the average trip count of the loop collected during the profiling phase may not be representative of the loop's trip count during late execution stages and the resulting loop optimizations (i.e. loop transformations) that were well-suited for the beginning stages of execution are not as effective, or possibly even damaging to performance, during many later critical stages of execution. Using unrepresentative trip count information to optimize a loop may increase the optimization overhead as well as miss many optimization opportunities.

An effective way to maintain the prediction accuracy of the average trip count is to continuously monitor the trip count over the entire lifespan of the program. The loop body code can be dynamically updated many times during execution using the monitoring results to determine the specific optimizations. The average trip count data is helpful in determining the type of optimizations to perform on the loop. There are many possible optimizations that can be performed on a loop including loop peeling, loop unrolling, data prefetching, and software pipelining, among others. Loop peeling can simplify a loop with a problematic first iteration by performing that iteration separately before entering the loop. Loop unrolling duplicates the body of the loop multiple times in order to decrease the number of times the loop condition is tested as well as the number of jumps taken, which hurt performance by impairing the instruction pipeline. Data prefetching calls data into the cache before the processor needs it. Software pipelining is a technique that reforms the loop so that a faster execution rate is realized because iterations are executed in overlapped fashion to increase parallelism.

In one embodiment, a loop classified as having a low average trip count (e.g., under 10) potentially would be a good candidate for loop peeling and loop unrolling optimizations, but a poor candidate for data prefetching and software pipelining optimizations. A loop classified as having a medium average trip count (e.g., between 10 and 50) potentially would be a good candidate for loop unrolling and software pipelining, but a poor candidate for software prefetching. Whereas a loop classified as having a high average trip count (e.g. above 50) potentially would be a good candidate for both software pipelining and data prefetching. The loop optimization techniques specified are some of the many potential loop optimizations that would benefit from accurate trip count predictions. Thus, in one embodiment of the present invention two threshold values are determined (Tlow and Thigh). An average trip count less than Tlow would be considered a low trip count and low trip count specific optimizations could be performed accordingly. An average trip count greater than Thigh would be considered a high trip count and high trip count specific optimizations could be performed. An average trip count between Tlow and Thigh or equal to one of the two numbers would be considered a medium trip count and medium trip count specific optimizations could then be performed. The specific threshold numbers given in the examples above could be modified based on the software application(s) that were in need of optimizations. In another embodiment, one threshold value that distinguished only between low and high average trip count values is used. In yet another embodiment, three or more threshold values that could discretely distinguish between many average trip count levels.

An additional trip count issue arises when a loop has an average trip count that changes significantly multiple times throughout the lifespan of the program. Not only can a loop change its trip count classification between the profiling phase and the later stages of the program, but the program could have significant periods of time where the trip count is stable within different ranges. For example, a loop with an average trip count of 30 in the profiling phase could then jump to an average trip count of 70 for a significant portion of the program execution, then drop to an average trip count of 5 in the late stages of the program. If the trip count was monitored over the course of the entire program the average might be somewhere around the profiling phase average of 30 but that average, even though taken over the entire lifespan of the program, would not be representative of the loop for significant portions of the program. Thus, in one embodiment of the present invention, as the average trip count of a loop moves up and down throughout the program lifespan the loop's trip count classification changes if the movements cross a trip count classification threshold boundary. Alternatively, in another embodiment the trip count classification will not immediately change upon crossing a threshold boundary. The threshold boundary conditions implements a grace value to tolerate slight changes in trip counts without modifying the optimization policies of the loop. If a loop's average trip count value is hovering very close to a threshold value for a great deal of the program's execution lifespan slight perturbations could change the loop modification policies fairly regularly, which would slow down execution with much optimization change overhead. Such an unwanted anomaly could be remedied with a grace value, which doesn't change the optimization policies unless a threshold value is passed by a certain percentage (e.g. 10%).

Figure 2:
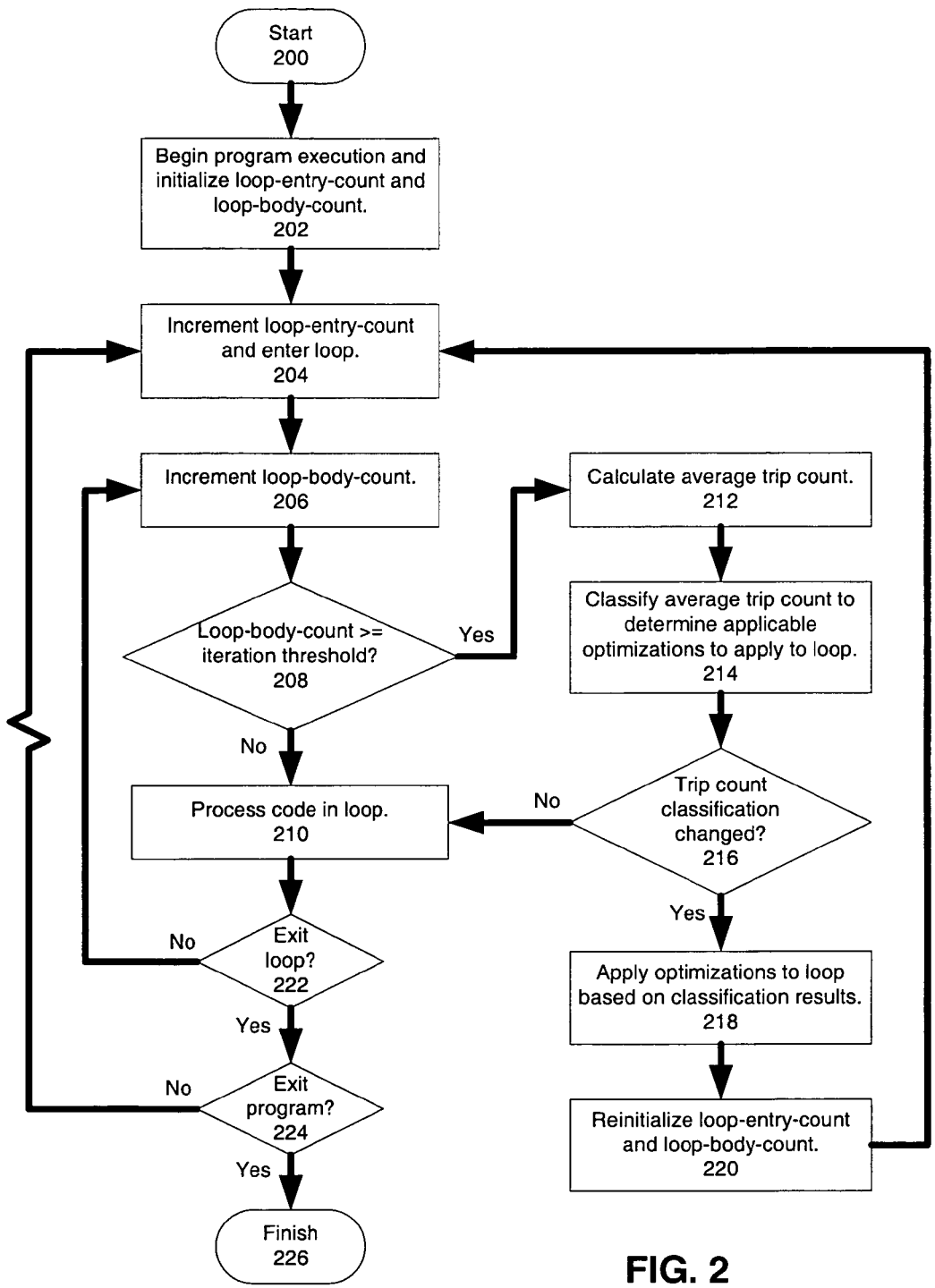
FIG. 2 illustrates an embodiment of a method that continuously monitors the trip count of a loop but only takes the running average of the trip count after the iteration threshold has been passed.

The general nature of a loop reveals that its trip count normally does not vary greatly each time the loop is entered. Most loops actually have relatively stable trip counts for significant periods of time, although not necessarily for the entire program lifespan. Thus, the average trip count can be checked intermittently. In one embodiment of the present invention, the average trip count is checked after the loop has iterated a given number of times. Once the loop has iterated this preset number of times (an iteration threshold), the average is calculated and then the regular program execution continues. FIG. 2 illustrates an embodiment of a method that continuously monitors the trip count of a loop by taking the running average of the trip count after the iteration threshold has been passed and then using the results to dynamically optimize the loop during execution. At the start 200 of the method the program begins execution by initializing two counters, the loop-entry-count and the loop-body-count 202. These two counters can determine the average trip count of a loop over a given time with this equation:

Average Trip Count=Loop-Body-Count/Loop-Entry-Count

As detailed earlier, the average trip count is the number of times a loop body is executed each time the loop is entered averaged over a given execution period. In one embodiment, the execution period can equal a given amount of time. In another embodiment, the execution period can equal a given number of iterations through the loop body, as is the case in this example. The loop is then entered in the next stage of FIG. 2 and the loop-entry-count is incremented 204. Once in the loop the loop-body-count is incremented 206 and a check is performed to determine if the loop-body-count is greater than or equal to the iteration threshold value 208. If the loop-body-count is less than the iteration threshold value the rest of the code within the loop is processed 210 and a check is made to determine whether or not a loop exit condition has taken place 222.

Once the loop-body-count has equaled or exceeded the iteration threshold the average trip count will calculated 212. Next, the average trip count will be classified to determine the applicable optimizations to apply to the loop (e.g., loop unrolling, software pipelining, data prefetching, etc.) 214. After the determination is made as to the average trip count classification for the loop a check is made to determine if the loop trip count classification has changed 216. If a classification change has taken place then the relevant optimizations are applied dynamically to the loop body code 218, and the loop will be retranslated (i.e. recompiled) in real-time. In another embodiment of the present invention, code that is related to the loop (possibly located in the pre-header block of code, the post-exit block of code, or in other relevant locations in the loop region or other regions of code) is optimized to increase the performance of the loop. In yet another embodiment, the code that is optimized is not necessarily meant to improve the performance throughput of the loop but rather to improve the resulting data output from the loop among other reasons.

If the classification has not changed since the last average trip count classification no optimizations would need to be implemented and the rest of the code within the loop will be processed 210. After any needed optimizations are in place the loop-entry-count and loop-body-count counters are reinitialized 220 and the control flow returns to the entry point of the loop 204.

When the exit condition for the loop does take place and the loop exits at 222 the control flow continues and the code that is below the loop is executed. In one embodiment the loop could be nested within one or more larger loops and the control flow eventually returns to the loop entry point 204. Regardless, each time the loop is exited the program either will eventually enter the loop again at 204 or eventually exit the program without re-entering the loop and finish at 226, this decision is determined at 224 of the flow diagram. If the program does return to the loop entry point at 204 it might immediately return (e.g. in a tight nested loop) or return at a much later point in the program lifespan.

It would be beneficial for the iteration threshold to be set to a significantly high value. This allows for less overhead during program execution. In one embodiment, the iteration threshold could equal 50,000 iterations through the loop. This specific number of iterations could be modified up or down to pinpoint the most efficient frequency for checking the average trip count. In another embodiment, the iteration threshold could be set to a time of 1 second of absolute program time. Thus, once every second the average trip count of the loop could be checked and the code reoptimized. Again, this absolute time could be adjusted up and down based on the most efficient frequency for checking the average trip count.

Figure 3:
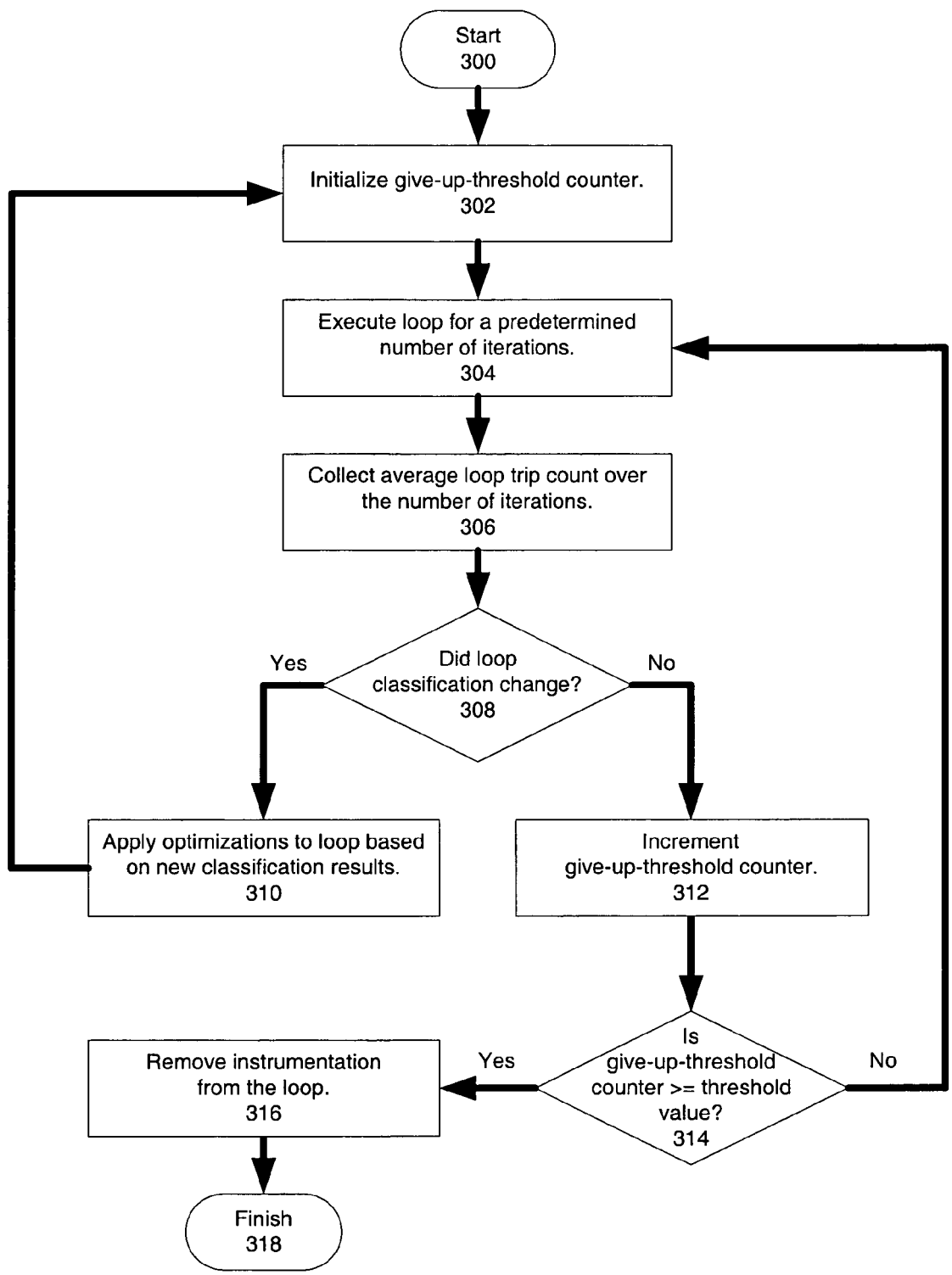
FIG. 3 illustrates one embodiment of a method capable of monitoring a loop's trip count, optimizing the loop if the trip count classification changes, and discontinuing the monitoring if the trip count classification does not change after a given period of time.

Some programs have loop trip counts that are quite uniform throughout the entire program lifespan. If this is the case it is unnecessary and inefficient to continually monitor the loop's trip count. Thus, it would be beneficial in one embodiment of the present invention to stop monitoring the loop trip count if after a certain number of iterations the average trip count has not significantly changed. FIG. 3 illustrates one embodiment of a method capable of monitoring a loop's trip count, optimizing the loop if the trip count classification changes, and discontinuing the monitoring if the trip count classification does not change after a given period of time. At the start 300 of the method the give-up-threshold counter is initialized 302. Next, the loop is executed for a pre-determined number of iterations 304 (i.e. the iteration threshold detailed in FIG. 2). Once the loop has hit the iteration threshold the average loop trip count is collected 306. Then a check is made to determine whether the loop classification changed 308. If the classification did change the new optimizations based on the classification results are applied to the loop 310 and the control flow returns to the beginning of the method to reinitialize the give-up-threshold counter 302 and go on from there.

Otherwise, if the classification did not change in 308 then the give-up-threshold counter is incremented 312 and a check is performed to determine if the give-up-threshold counter is equal to or greater than the actual threshold value determined to give up on further monitoring the loop 314. If the threshold value has been met or exceeded the loop instrumentation is removed from the loop 316, otherwise the loop begins executing again for the predetermined number of iterations 304. The give-up-threshold counter increments once per iteration threshold number of loop iterations, therefore the give-up-threshold is related to the number of times the loop's average trip count is calculated consecutively without a classification change prior to giving up on the monitoring effort. For example, if the loop give-up-threshold counter were 100, the loop would need to have the average trip count calculated 100 consecutive times without a classification change to initiate the removal of the monitoring instrumentation. In another embodiment, the give-up-threshold counter could be equal to the total number of loop iterations (relating to the loop-body-count counter in FIG. 2) instead of the total number of average trip count calculations. In that embodiment the loop-body-count counter would need to be added to the current give-up-threshold counter each time the average trip count was calculated without a classification change. For example, in this embodiment, if the give-up-threshold were 5,000,000, the loop would need to iterate 5,000,000 times consecutively without a classification change to initiate the removal of the monitoring instrumentation. In either embodiment the give-up-threshold counter could be modified to any given larger or smaller value for efficiency purposes depending on the specific software being monitored.

In one embodiment of the present invention, dynamic optimizations (also referred to as transformations) are separated into two classes to efficiently monitor the trip count continuously: scalar optimizations (i.e. scalar transformations) that do not need accurate trip count information (such as common subexpression elimination (cse) where a subexpression (e.g. A+B) referred to frequently is calculated only once) and loop optimizations that do require accurate trip count information to be effective (such as loop unrolling, software pipelining, data prefetching, etc.). In one embodiment, the scalar optimizations are applied at the end of the profiling phase using the initial profile information and the loop optimizations are postponed until more accurate trip count information is available. In another embodiment, loops can be classified as being easy or hard. Loops with a regular control flow graph often can be identified with few early exits and the loop conditions are controlled by simple induction variables. Many floating-point intensive programs usually have simple control flows such as this. These can be referred to as easy loops. Other loops would therefore be referred to as hard loops. Easy loops are fairly predictable so their trip counts from the initial profiles in the profiling phase are usually fairly accurate. Thus, in one embodiment, if loops can be partitioned into these two categories then at the end of the profiling phase both scalar and loop optimizations can be applied effectively to easy loops. For hard loops, since most of the trip count information from the initial profile is likely incorrect, the loop optimizations are postponed until more accurate trip count information is available.

Figure 4:
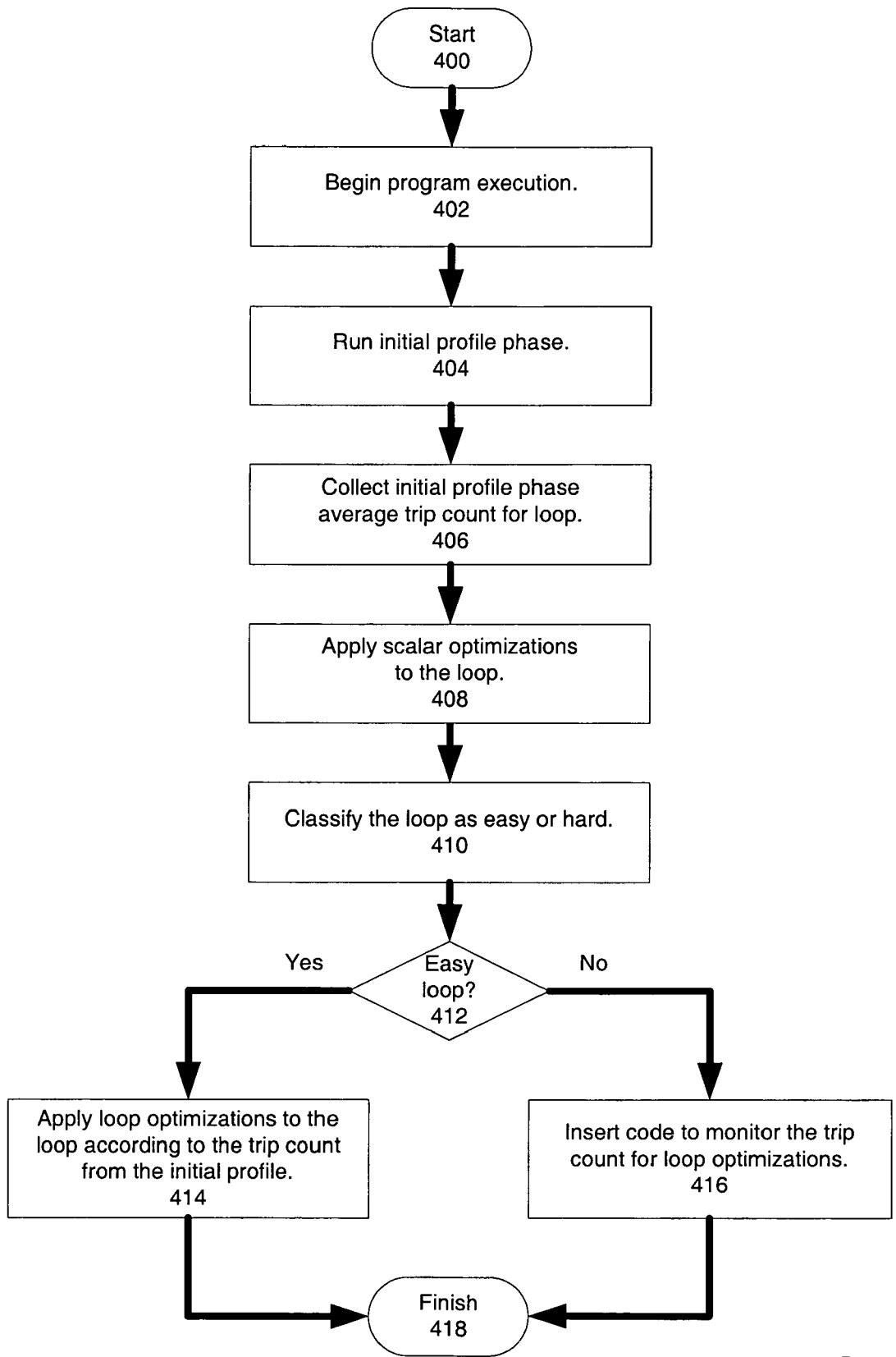
FIG. 4 illustrates one embodiment of a method capable of classifying easy loops and hard loops and applying the relevant optimizations to each class.

FIG. 4 illustrates one embodiment of a method capable of classifying easy loops and hard loops and applying the relevant optimizations to each class. At the start 400 of the method the program begins execution 402. The initial profiling phase is run 404 and the initial profiling phase average loop trip count is collected 406. Other information can also be gathered during the initial profiling phase as needed. Next, scalar optimizations are applied to the loop based on the information obtained from the initial profiling phase 408. The loop is then classified as easy or hard 410 based on the information collected from the initial profiling phase. A determination is made as to whether the loop is easy or hard 412. If the loop is easy the relevant loop optimizations are applied to the loop based on the initial profile information 414. Otherwise, if the loop is hard code is inserted to monitor the loop's trip count for potential future dynamic loop optimizations 416 and the method is finished 418.

Figure 5:
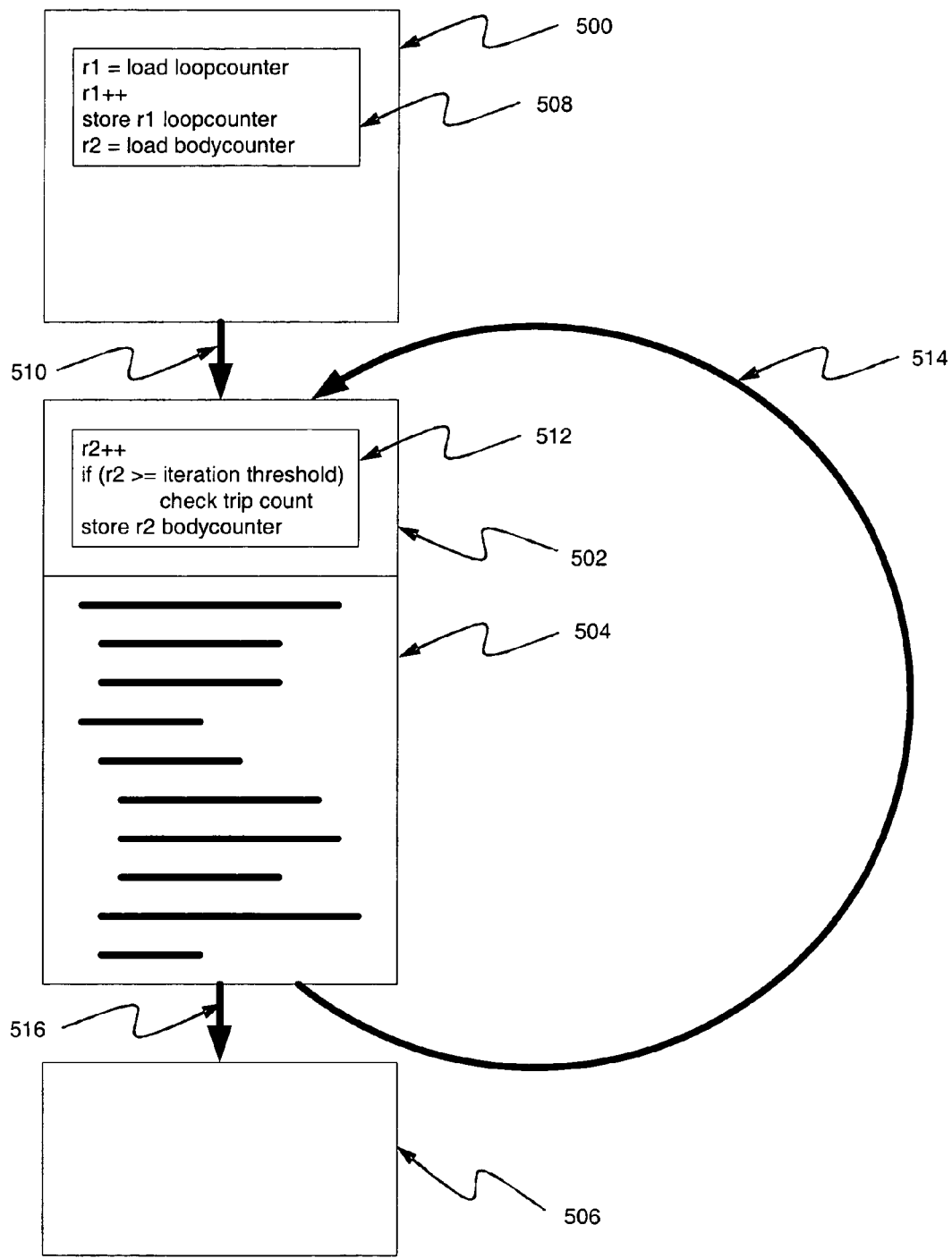
FIG. 5 details a first implementation of monitoring code used to determine the loop's trip count in an embodiment of the present invention.

Monitoring code that is inserted into the loop body code must be as small as possible. The key is to have very light-weight instrumentation so the trip count information can be collected without performance impact on the scalar-optimized loops. FIG. 5 details the code necessary within (and near) the loop body to effectively monitor the trip count in one embodiment of the present invention. A segment of code is displayed with a pre-head block of code 500, a loop entry block of code 502, a loop body 504, and a post-exit block of code 506. Each time the pre-head block 500 is entered the loop pre-head monitoring code 508 is executed. The loop-entry-count counter is loaded into one register, that register is incremented, and the new value of the register is stored back into the loop-entry-count counter. Finally, the loop-body-counter is loaded into a second register. Next, as the control flow of the program enters 510 the loop entry block 502 the loop entry block monitoring code 512 is executed. First, the second register is incremented. Next, a check is made to determine if the iteration threshold has been met or exceeded. If the threshold has been met or exceeded the average trip count is checked by calling the check trip count function (this is detailed in FIG. 3). Finally, the new value in the second register is stored back into the loop-body-count counter. Once the loop entry block monitoring code 512 has been executed the rest of the code in the loop body 504 is executed. The loop either exits 516 into the post-exit block 506 or loops back 514 to the top of the loop body. The goal is to have the least number of lines of monitoring code located within the loop entry block 502 and the loop body 504 itself. In this embodiment, there are four lines of code within the loop entry block that are used for monitoring the trip count.

Figure 6:
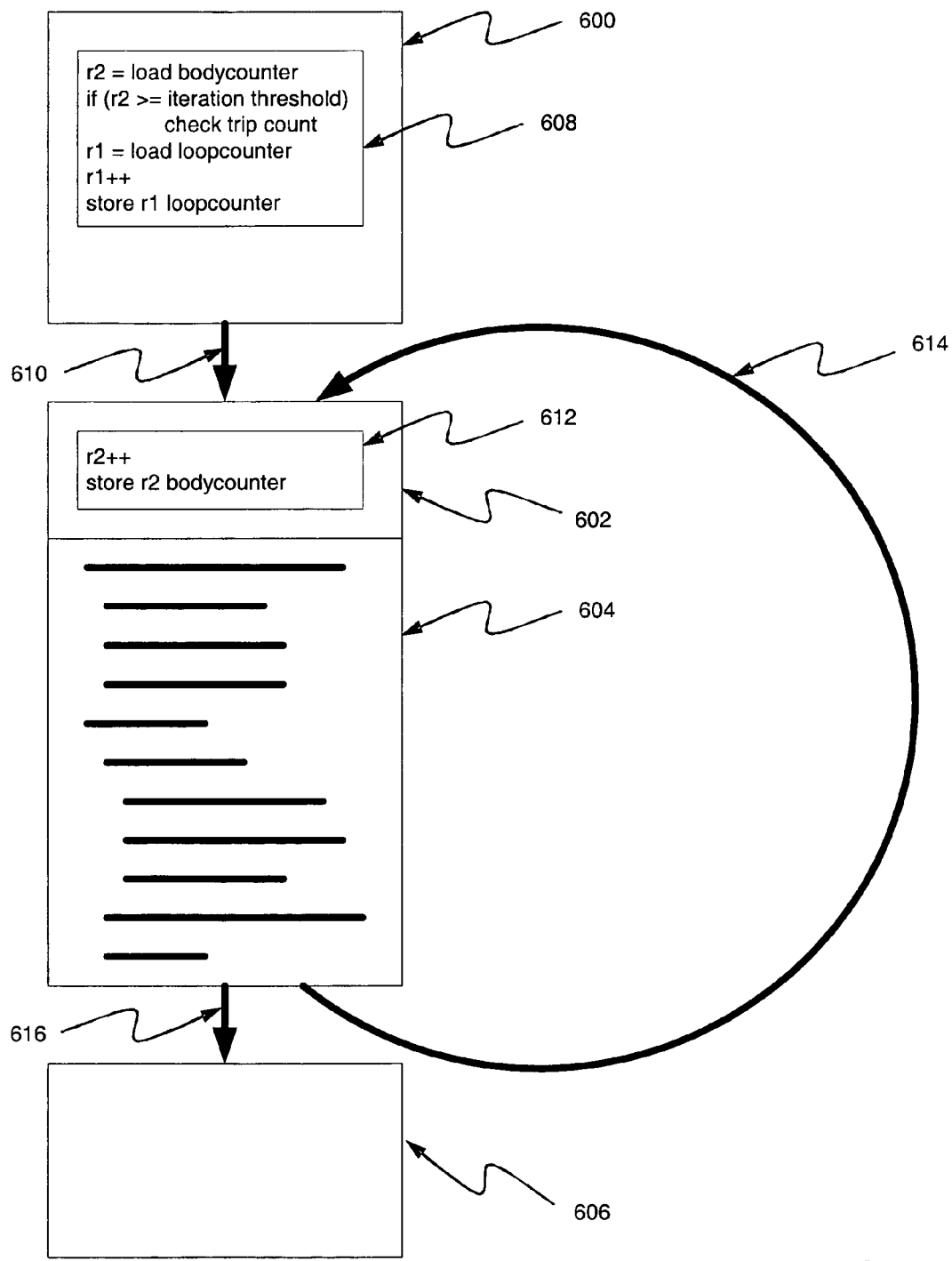
FIG. 6 details a second implementation of monitoring code used to determine the loop's trip count in an embodiment of the present invention.

FIG. 6 details another implementation of monitoring code used to determine the loop's trip count in an embodiment of the present invention. A segment of code is displayed with a pre-head block of code 600, a loop entry block of code 602, a loop body 604, and a post-exit block of code 606. Each time the pre-head block 600 is entered the loop pre-head monitoring code 608 is executed. Initially, the loop-body-counter is loaded into a second register. Next, a check is made to determine if the iteration threshold has been met or exceeded. If the threshold has been met or exceeded the average trip count is checked by calling the check trip count function (this is detailed in FIG. 3). Then the loop-entry-count counter is loaded into the first register, that register is incremented, and the new value of the register is stored back into the loop-entry-count counter. Next, as the control flow of the program enters 610 the loop entry block 602, the loop entry block monitoring code 612 is executed. First, the second register is incremented. Finally, the new value in the second register is stored back into the loop-body-count counter. Once the loop entry block monitoring code 612 has been executed the rest of the code in the loop body 604 is executed. The loop either exits 616 into the post-exit block 606 or loops back 614 to the top of the loop entry block 602. In this embodiment, there are only two lines of code within the loop entry block that are used for monitoring the trip count. The downside of this monitoring code implementation scheme is that the loop may iterate too many times (i.e. higher than the iteration threshold). When this happens, the average trip count calculation will not be performed until the next time the loop is entered, which may delay the optimizations for the loop. To determine the most efficient loop optimization scheme would require weighing the instrumentation overhead penalty against the benefits of more accurate trip count monitoring.

Figure 7:
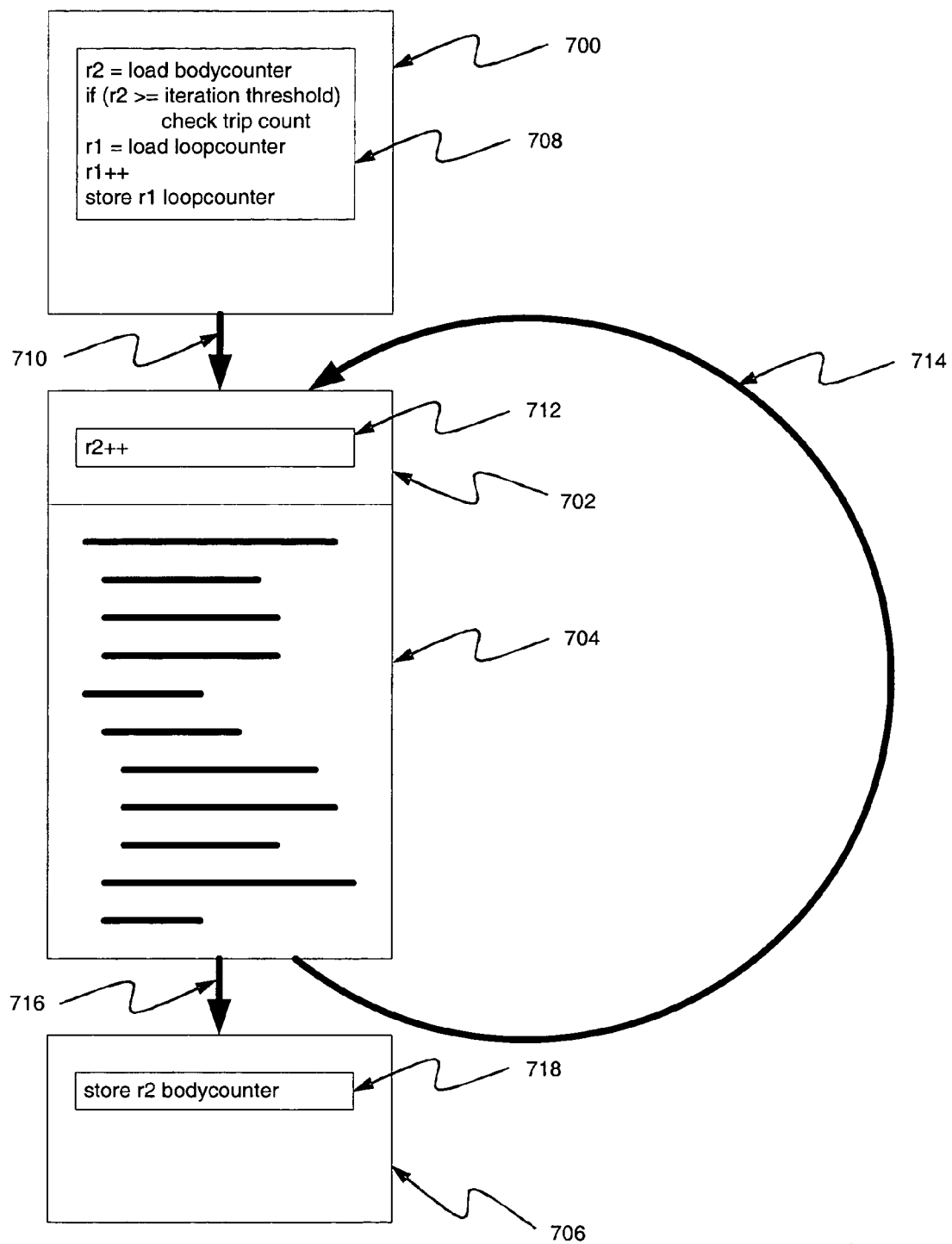
FIG. 7 details a third implementation of monitoring code used to determine the loop's trip count in an embodiment of the present invention.

FIG. 7 details yet another implementation of monitoring code used to determine the loop's trip count in an embodiment of the present invention. A segment of code is displayed with a pre-head block of code 700, a loop entry block of code 702, a loop body 704, and a post-exit block of code 706. Each time the pre-head block 700 is entered the loop pre-head monitoring code 708 is executed. Initially, the loop-body-counter is loaded into a second register. Next, a check is made to determine if the iteration threshold has been met or exceeded. If the threshold has been met or exceeded the average trip count is checked by calling the check trip count function (this is detailed in FIG. 3). Then the loop-entry-count counter is loaded into the first register, that register is incremented, and the new value of the register is stored back into the loop-entry-count counter. Next, as the control flow of the program enters 710 the loop entry block 702, the loop entry block monitoring code 712 is executed. In this embodiment, there is only one line of monitoring code within the loop entry block, incrementing the second register. Once the loop entry block monitoring code 712 has been executed the rest of the code in the loop body 704 is executed. The loop either exits 716 into the post-exit block 706 or loops back 714 to the top of the loop entry block. When the loop exits into the post-exit block 706 the post-exit monitoring code 718 is executed. This entails storing the value currently in the second register back into the loop-body-count counter. As mentioned, in this embodiment, there is only one line of code within the loop entry block used for monitoring the trip count. This implementation has the same downside as the implementation detailed in FIG. 7, the loop may iterate too many times. Again, to determine the most efficient loop optimization scheme would require weighing the instrumentation overhead penalty against the benefits of more accurate trip count monitoring.

Thus, embodiments for an effective method to continuously profile loop trip counts and to dynamically optimize the loop throughout the life of the program using the profile results are disclosed. These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
    collecting a loop trip count continuously during runtime of a region of code being executed that contains a loop, the loop trip count being collected each time the loop is entered by one or more monitoring counters instrumented in the region of code;
    calculating an average trip count continuously during runtime, wherein each average trip count comprises a sequential plurality of collected trip counts over an interval of time;
    classifying each average trip count to be in one of a plurality of conditions, the one of the plurality of conditions to identify one or more code modification techniques applicable to the loop;
    dynamically applying, during the same runtime, the one or more applicable code modification techniques to alter the code that relates to the loop when the average trip count classification changes;
    halting the trip count data collection during the same runtime when a threshold value of consecutive intervals of time pass without a trip count classification change; and
    removing one or more monitoring counters, during the same runtime, from the region of code relating to the loop when trip count data collection is halted.

2. The method of claim 1 further comprising executing the region of code for an introductory profiling phase time interval to establish an initial average trip count value.

3. The method of claim 2, wherein dynamically applying the one or more applicable code modification techniques further comprises applying one or more scalar transformation techniques to the loop upon receiving the initial average trip count value.

4. The method of claim 2, further comprising:
    determining a low trip count threshold value and a high trip count threshold value;
    classifying the trip count as being in a first condition if the trip count is equal to or below the low trip count threshold value;
    classifying the trip count as being in a second condition if the trip count is above the low trip count threshold value and below the high trip count threshold value; and
    classifying the trip count as being in a third condition if the trip count is equal to or above the high trip count threshold value.

5. The method of claim 4 further comprising:
    classifying the average trip count upon completion of each time interval subsequent to the introductory profiling phase to identify one or more loop transformation techniques applicable to the loop; and
    dynamically applying the one or more applicable loop transformation techniques to alter the code that relates to the loop if the trip count classification changes.

6. The method of claim 5, wherein applying loop transformations to the loop based on each trip count classification further comprises:
    applying loop peeling and loop unrolling transformations to the loop if the trip count classification is in the first condition;
    applying loop unrolling and software pipelining optimizations to the loop if the trip count classification is in the second condition; and
    applying software pipelining and data prefetching optimizations to the loop if the trip count classification is in the third condition.

7. The method of claim 2 further comprising:
    determining if the loop has a regular control flow graph; and
    applying one or more scalar transformation techniques to the code relating to the loop and one or more loop transformations to the code relating to the loop upon receiving the initial trip count value if the control flow graph is regular.

8. The method of claim 2 further comprising:
    determining if the loop has substantial floating-point operations; and
    applying one or more scalar transformation techniques to the code relating to the loop and one or more loop transformations to the code relating to the loop upon receiving the initial trip count value if the loop has substantial floating-point operations.

9. The method of claim 1, wherein collecting a loop trip count further comprises:
   collecting a trip count for the loop each time the loop is entered; and
   calculating an average trip count using a sequential plurality of collected trip counts over a determined number of iterations through the loop.

10. The method of claim 9, wherein the number of iterations through the loop is 50,000.

11. The method of claim 1, wherein the interval of time is equal to one second.

12. A computer machine readable medium having embodied thereon instructions, which when executed by a machine, causes the machine to perform a method comprising:
   collecting a loop trip count continuously during runtime of a region of code being executed that contains a loop, the loop trip count being collected each time the loop is entered by one or more monitoring counters instrumented in the region of code;
   calculating an average trip count continuously during runtime, wherein each average trip count comprises a sequential plurality of collected trip counts over an interval of time;
   classifying each average trip count to be in one of a plurality of conditions, the one of the plurality of conditions to identify one or more code modification techniques applicable to the loop;
   dynamically applying, during the same runtime, the one or more applicable code modification techniques to alter the code that relates to the loop when the average trip count classification chances;
   halting the trip count data collection during the same runtime when a threshold value of consecutive intervals of time pass without a trip count classification chance; and
   removing one or more monitoring counters, during the same runtime, from the region of code relating to the loop when trip count data collection is halted.

13. The machine readable medium of claim 12, wherein the method further comprises executing the region of code for an introductory profiling phase time interval to establish an initial average trip count value.

14. The machine readable medium of claim 13, wherein dynamically applying the one or more applicable code modification techniques further comprises applying one or more scalar transformation techniques to the loop upon receiving the initial average trip count value.

15. The machine readable medium of claim 13, further comprising:
   determining a low trip count threshold value and a high trip count threshold value;
   classifying the trip count as being in a first condition if the trip count is equal to or below the low trip count threshold value;
   classifying the trip count as being in a second condition if the trip count is above the low trip count threshold value and below the high trip count threshold value; and
   classifying the trip count as being in a third condition if the trip count is equal to or above the high trip count threshold value.

16. The machine readable medium of claim 15, wherein the method further comprises:
   classifying the average trip count upon completion of each time interval subsequent to the introductory profiling phase to identify one or more loop transformation techniques applicable to the loop; and
   dynamically applying the one or more applicable loop transformation techniques to alter the code that relates to the loop if the trip count classification changes.

17. A system, comprising:
   a bus;
   a processor coupled to the bus;
   a network interface card coupled to the bus; and
   memory coupled to the processor, the memory adapted for storing instructions, which upon execution by the processor causes the processor to
      collect a loop trip count continuously during runtime of a region of code being executed that contains a loop, the loop trip count being collected each time the loop is entered by one or more monitoring counters instrumented in the region of code;
      calculate an average trip count continuously during runtime, wherein each average trip count comprises a sequential plurality of collected trip counts over an interval of time;
      classify each average trip count to be in one of a plurality of conditions, the one of the plurality of conditions to identify one or more code modification techniques applicable to the loop;
      dynamically apply, during the same runtime, the one or more applicable code modification techniques to alter the code that relates to the loop when the average trip count classification chances;
      halt the trip count data collection during the same runtime when a threshold value of consecutive intervals of time pass without a trip count classification chance; and
      remove one or more monitoring counters, during the same runtime, from the region of code relating to the loop when trip count data collection is halted.

18. The system of claim 17, wherein the system executes the region of code for an introductory profiling phase time interval to establish an initial average trip count value.

19. The system of claim 18, wherein the system applies one or more scalar transformation techniques to the loop upon receiving the initial average trip count value.

20. The system of claim 18, wherein the instructions in the memory further cause the processor to:
   determine determines a low trip count threshold value and a high trip count threshold value;
   classify the trip count as being in a first condition if the trip count is equal to or below the low trip count threshold value;
   classify the trip count as being in a second condition if the trip count is above the low trip count threshold value and below the high trip count threshold value; and
   classify the trip count as being in a third condition if the trip count is equal to or above the high trip count threshold value.

21. The system of claim 20, wherein the instructions in the memory further cause the processor to:
   classify the average trip count upon completion of each time interval subsequent to the introductory profiling phase to identify one or more loop transformation techniques applicable to the loop; and
   dynamically apply the one or more applicable loop transformation techniques to alter the code that relates to the loop if the trip count classification changes.

* * * * *